United States Patent
Merritt et al.

(10) Patent No.: US 7,152,026 B1
(45) Date of Patent: Dec. 19, 2006

(54) VERSIONED NODE CONFIGURATIONS FOR PARALLEL APPLICATIONS

(75) Inventors: John Earl Merritt, Torrance, CA (US); Donald Raymond Pederson, San Diego, CA (US); Eric Thomas Potter, Redondo Beach, CA (US)

(73) Assignee: NCR Corp., Dayton, OH (US)

( * ) Notice: Subject to any disclaimer, the term of this patent is extended or adjusted under 35 U.S.C. 154(b) by 916 days.

(21) Appl. No.: 10/020,723

(22) Filed: Dec. 7, 2001

(51) Int. Cl.
*G06F 13/10* (2006.01)
*G06F 7/00* (2006.01)

(52) U.S. Cl. .................. 703/21; 703/13; 707/1; 707/4; 707/100; 713/1

(58) Field of Classification Search ............ 703/21, 703/22; 707/2, 7, 8; 713/1
See application file for complete search history.

(56) References Cited

U.S. PATENT DOCUMENTS

| | | | | |
|---|---|---|---|---|
| 5,924,093 A * | 7/1999 | Potter et al. | ............... | 707/7 |
| 6,009,264 A * | 12/1999 | Merritt et al. | ............... | 703/28 |
| 6,075,938 A * | 6/2000 | Bugnion et al. | ............... | 703/27 |
| 6,519,697 B1 * | 2/2003 | Denman et al. | ............... | 713/1 |
| 6,738,756 B1 * | 5/2004 | Brown et al. | ............... | 707/2 |
| 6,745,240 B1 * | 6/2004 | Denman et al. | ............... | 709/220 |
| 6,751,616 B1 * | 6/2004 | Chan | ............... | 707/8 |
| 6,772,163 B1 * | 8/2004 | Sinclair et al. | ............... | 707/100 |
| 6,934,755 B1 * | 8/2005 | Saulpaugh et al. | ............... | 709/226 |
| 7,080,101 B1 * | 7/2006 | Watson et al. | ............... | 707/201 |
| 2001/0027512 A1 * | 10/2001 | Hagersten | ............... | 711/202 |
| 2002/0112094 A1 * | 8/2002 | Pederson et al. | ............... | 709/330 |
| 2003/0037185 A1 * | 2/2003 | Davis et al. | ............... | 710/1 |

OTHER PUBLICATIONS

"Cellular Disco: resource management using virtual clusters on shared-memory multiprocessors", ACM Transactions on Computer Systems, vol. 18, No. 3, ACM 2000.*
"Accelerating Shared Virtual Memory via General-Purpose Network Interface Support", Bilas et al, ACM Transactions on Computer Systems, vol. 19, No. 1, Feb. 2001.*

* cited by examiner

*Primary Examiner*—Fred Ferris
(74) *Attorney, Agent, or Firm*—Baker Botts, LLP (57) ABSTRACT

A method for executing database transactions is disclosed. A plurality of interconnected nodes are each defined in terms of processor and storage resources of a parallel computing system. A first set of virtual processors is mapped across a first subset of the nodes to create a first map with at least one virtual processor being mapped to each node in the first subset. A second set of virtual processors is mapped across a second subset of the nodes to create a second map with at least one virtual processor being mapped to each node in the second subset. The first map is stored as a first configuration and the second map is stored as a second configuration. At least one transaction is executed using the first set of virtual processors and simultaneously at least one transaction is executed using the second set of virtual processors.

27 Claims, 5 Drawing Sheets

Active Configurations

| configuration version | nodes | virtual processors* | inuse |
|---|---|---|---|
| 101 | A, B, C, D | vprocs 1-16 | yes |
| 102 | A, B, D | vprocs 1-8, 13-16 | yes |
| 103 | A, B, C, D | vprocs 1-16 | yes |

* Each virtual processor is associated with a node

Transactions

| transaction | transaction group | configuration version | valid* | member vprocs |
|---|---|---|---|---|
| 1024 | 2002 | 101 | yes | vproc 2, 4, 5, 6, 13, 15, 16 |
| 1025 | 2003 | 101 | no | vproc 1, 2, 3, 4, 5, 8, 10, 11 |
| 1026 | 2004 | 102 | yes | vproc 2, 3, 4, 6, 13, 14, 15 |
| 1027 | 2005 | 103 | yes | vproc 1, 4, 6, 8, 12, 16 |
| 1024 | 2006 | 103 | yes | vproc 3, 5, 6, 8, 9, 11, 14 |

* Validity of the transaction group

*FIG. 5*

VERSIONED NODE CONFIGURATIONS FOR PARALLEL APPLICATIONS

BACKGROUND

Parallel systems employ a plurality of processors to perform tasks more quickly than would be possible with a single processor. Conventional software directing such systems breaks tasks into subtasks that can be more performed simultaneously. Parallel systems can also operate unconstrained by physical boundaries between hardware devices. For example, a parallel system can logically treat a single physical processor as two virtual processors by dividing the resources of the single processor between the two virtual entities. Virtual processors can also be allocated portions of the electronic storage capacity of the overall system in addition to a portion of the processing capacity. In such a system, if a task requires manipulation of specific data, the virtual processor that has been allocated the storage with that data is often the best choice for performing the task. Parallel system software conventionally includes substantial subportions dedicated to communications between the virtual processors.

The resources of some parallel systems are also organized on a higher level than the virtual processors. While the units of higher level organization can be given many different names, the term "nodes" will be used to discuss such units herein. Communication between virtual processors to achieve a task can entail communication between nodes when the virtual processors are associated with different nodes. Communication between the simultaneously active portions of a parallel system can become difficult when hardware or software problems cause a subset of the processing or storage resources to become unavailable. Communications can be established by repeating the procedure by which the system was initiated. During this re-initiation process, processing activity may be interrupted and progress that may have been achieved on tasks that the parallel system was addressing may be lost.

SUMMARY

In general, in one aspect the invention includes a method for executing database transactions. A plurality of interconnected nodes are each defined in terms of processor and storage resources of a parallel computing system. A first set of virtual processors is mapped across a first subset of the nodes to create a first map with at least one virtual processor being mapped to each node in the first subset. A second set of virtual processors is mapped across a second subset of the nodes to create a second map with at least one virtual processor being mapped to each node in the second subset. The first map is stored as a first configuration and the second map is stored as a second configuration. At least one transaction is executed using the first set of virtual processors and simultaneously at least one transaction is executed using the second set of virtual processors.

Other features and advantages will become apparent from the description and claims that follow.

DETAILED DESCRIPTION

Figure 1:
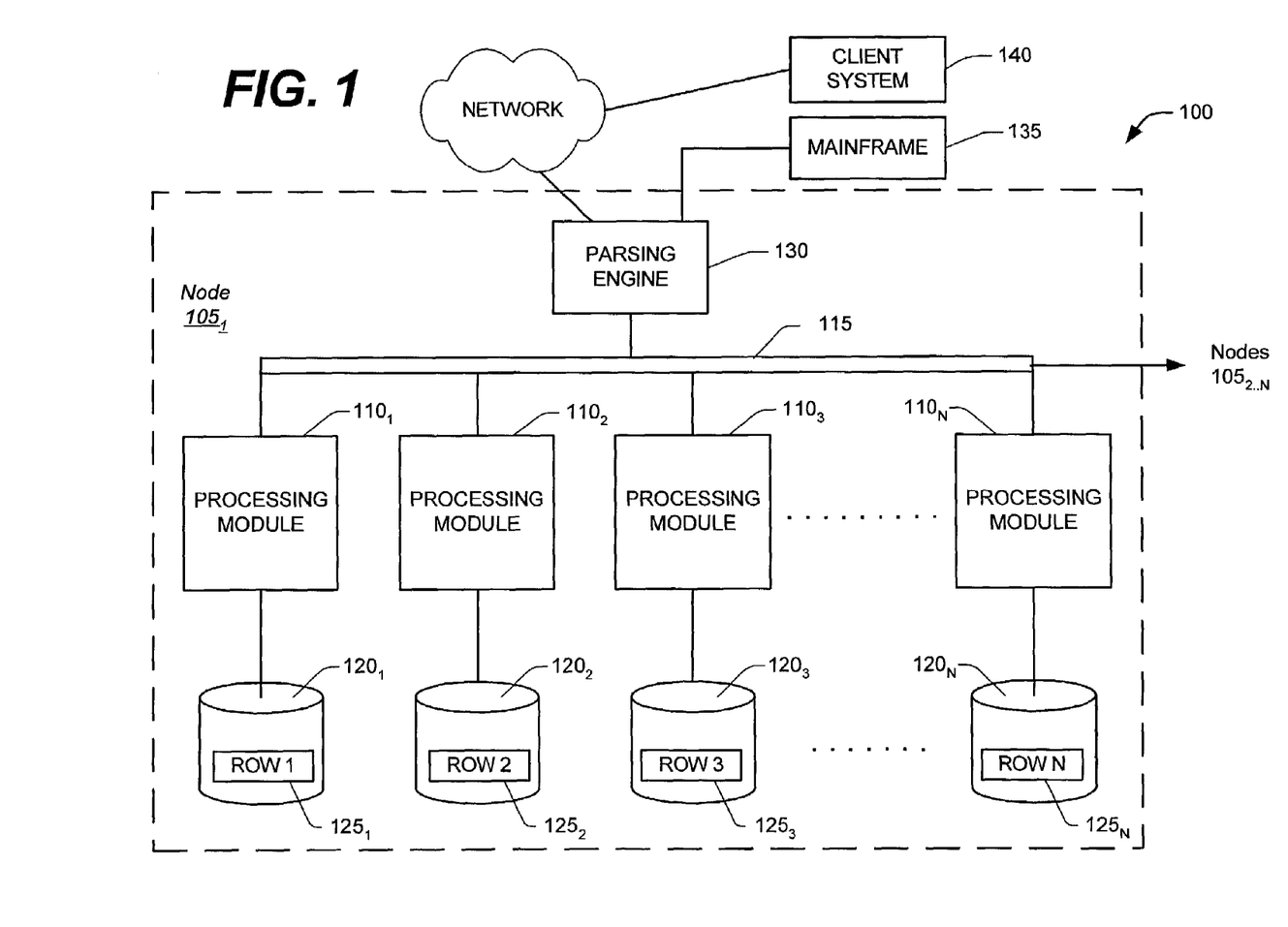
FIG. 1 is a block diagram of a node of a parallel processing system.

The versioned node configurations technique disclosed herein has particular application, but is not limited, to large databases that might contain many millions or billions of records managed by a database system ("DBS") 100, such as a Teradata Active Data Warehousing System available from NCR Corporation. FIG. 1 shows a sample architecture for one node 105$_1$ of the DBS 100. The DBS node 105$_1$ includes one or more processing modules 110$_{1 \ldots N}$, connected by a network 115, that manage the storage and retrieval of data in data-storage facilities 120$_{1 \ldots N}$. Each of the processing modules 110$_{1 \ldots N}$ may be one or more physical processors or each may be a virtual processor, with one or more virtual processors running on one or more physical processors.

For the case in which one or more virtual processors are running on a single physical processor, the single physical processor swaps between the set of N virtual processors.

For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules 110$_{1 \ldots N}$ manages a portion of a database that is stored in one of the corresponding data-storage facilities 120$_{1 \ldots N}$. Each of the data-storage facilities 120$_{1 \ldots N}$ includes one or more disk drives. The DBS may include multiple nodes 105$_{2 \ldots N}$ in addition to the illustrated node 105$_1$, connected by extending the network 115.

The system stores data in one or more tables in the data-storage facilities 120$_{1 \ldots N}$. The rows 125$_{1 \ldots Z}$ of the tables are stored across multiple data-storage facilities 120$_{1 \ldots N}$ to ensure that the system workload is distributed evenly across the processing modules 110$_{1 \ldots N}$. A parsing engine 130 organizes the storage of data and the distribution of table rows 125$_{1 \ldots Z}$ among the processing modules 110$_{1 \ldots N}$. The parsing engine 130 also coordinates the retrieval of data from the data-storage facilities 120$_{1 \ldots N}$ in response to queries received from a user at a mainframe 135 or a client computer 140. The DBS 100 usually receives queries and commands to build tables in a standard format, such as SQL.

In one implementation, the rows 125$_{1 \ldots Z}$ are distributed across the data-storage facilities 120$_{1 \ldots N}$ by the parsing engine 130 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket". The hash buckets are assigned to data-storage facilities 120$_{1 \ldots N}$ and associated processing modules 110$_{1 \ldots N}$ by a hash bucket map. The characteristics of the columns chosen for the primary index determine how evenly the rows are distributed.

In one implementation, nodes are defined physically, in that the processors and storage facilities associated with a node are generally physically proximate as well. For this reason, it is possible that a hardware or software problem encountered by a node will result in the unavailability of the processor and storage resources associated with that node.

Figure 2:
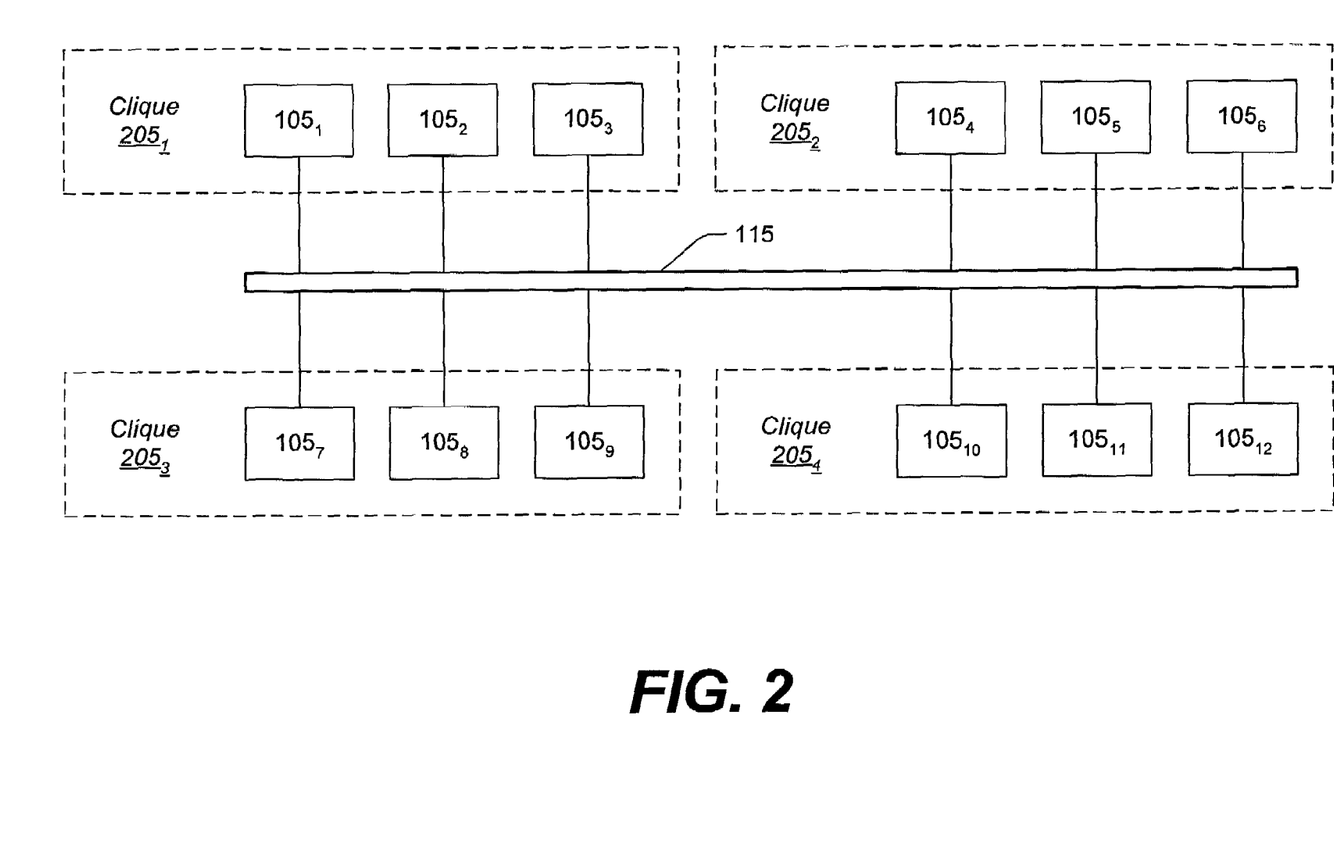
FIG. 2 is a block diagram of a node-based parallel processing system.

Higher level groupings of resources than nodes can also be implemented. FIG. 2 is a block diagram of a node-based parallel processing system. The nodes $105_{1-12}$ are grouped into cliques $205_{1-4}$ by threes. The cliques $205_{1-4}$ include nodes that can be configured to share storage facilities. For example, if node $105_1$ were to experience a processor failure, either of nodes $105_{2-3}$, but none of nodes $105_{4-12}$, can be reconfigured to access the data contained in the storage facilities that were previously associated with node $105_1$. Thus, in this implementation, cliques define the atomic level of configurable storage access while nodes define the atomic level of configurable processor access. In other implementations, the atomic levels for those types of access are different. For example, the nodes within the cliques communicate with each other through the network 115. The network 115 can include software that monitors that availability As of the nodes $105_{1-12}$ both by determining when particular nodes fail and by determining when nodes are restored or added.

Transactions performing tasks that involve manipulating certain data employ virtual processors having access to that data. Mapping functions are applied to the data and the results are used to partition the data to specific virtual processors. Using the same mapping functions, transactions can determine which virtual processors will be needed for a particular task. That group of virtual processors is identified as a transaction group. One transaction can have multiple transaction groups with a different subset of the virtual processors belonging to each transaction group. In one implementation, a transaction can establish transaction groups at different times during the execution of the transaction. For the duration of a transaction a single group identifier can be associated with the subset of virtual processors for the purposes of, e.g., insertion, processing and extraction of collectively associated data.

Figure 3:
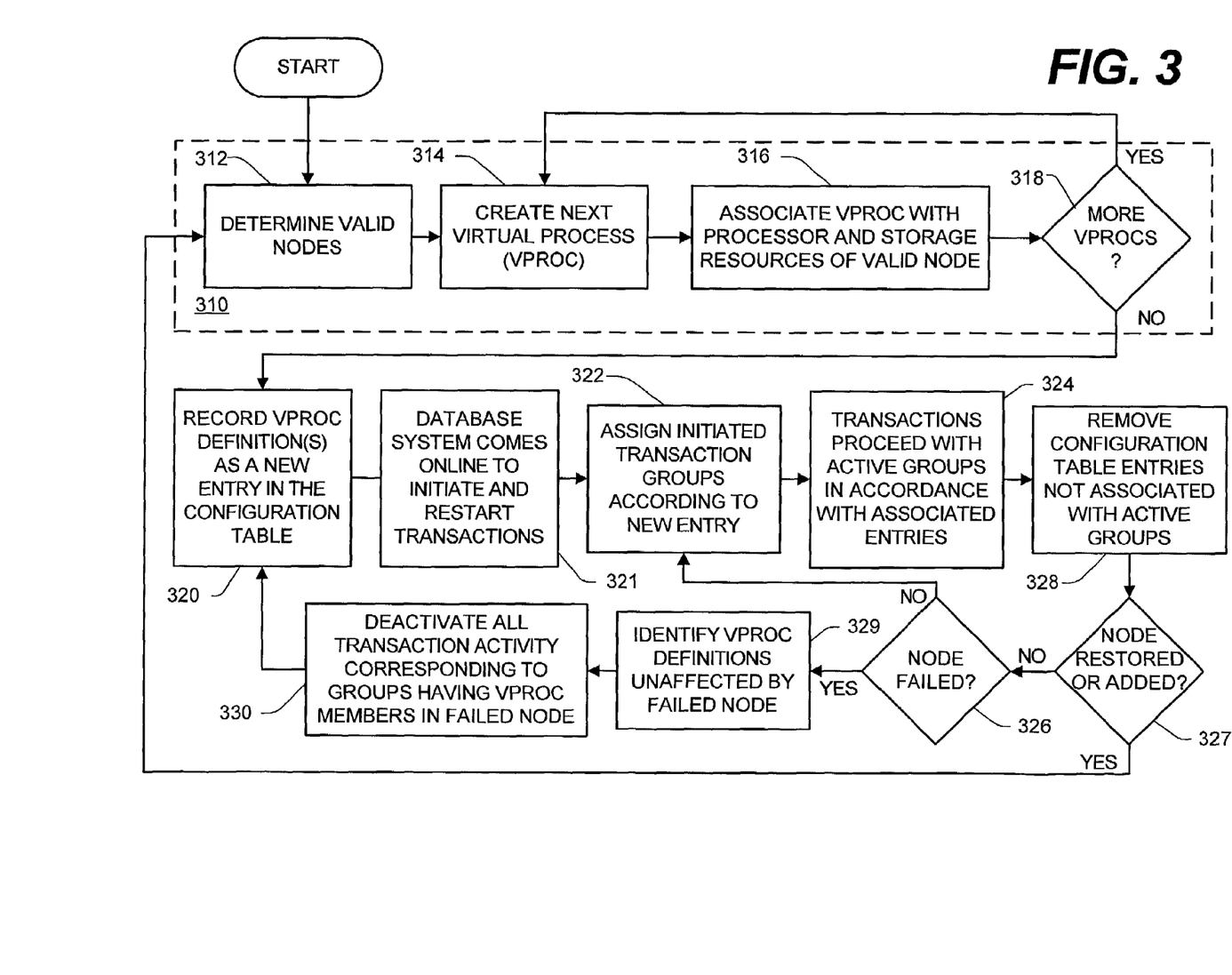
FIG. 3 is a flowchart of a method for executing transactions in accordance with node configurations.

FIG. 3 is a flowchart of a method for executing transactions in accordance with node configurations. A mapping of virtual processors to valid nodes is generated 310. To accomplish this, nodes that are capable of reliably supporting a virtual processor, also referred to herein as "valid nodes," are identified 312. In one implementation, an invalid or failed node is identified by the failure to send a "heartbeat" signal to the network 115. A heartbeat signal is a particular signal that is sent on a regular basis as long as operation is normal. A virtual process, or vproc, is then created 314. The vproc is associated with processor and storage resources 316. In one implementation, only processor and storage resources from a single node are associated with a single vproc. If additional vprocs are desired 318, the others are created in the same fashion.

The definitions of the vprocs are then recorded as an entry in a configuration table 320. The entry includes the association of vprocs to nodes. In one implementation, each entry or configuration is identified by an unique version number. That version number can then be used to reference a specific entry within the table of active configurations. For example, for each vproc the table entry may list the node that contains that vproc's processor and storage resources. In another implementation, the vprocs can just be listed by node. In different implementations, different amounts of information about the vprocs is stored in the configuration table entry.

After the new entry has been created the database system comes online to initiate new transaction tasks and restart existing transaction tasks 321. New transaction groups initiated for transaction tasks are assigned to the new entry 322. Thus, a transaction group initiated after the creation of a new entry will include vprocs that are defined in relation to the nodes by the new entry in the configuration table. Transaction groups that were initiated prior to the addition of the current entry of the configuration table, and have not been halted, will continue to employ vprocs in accordance with the configuration table entry that was current when that transaction group was formed 324. In one implementation, if a configuration table entry is not associated with active transaction groups, it is removed 328. As long as additional nodes do not become available 327 and the nodes do not fail 326, the current configuration table entry can be maintained.

In the event of node failure 326, the system identifies vprocs that are not affected by the failed node 329. Transaction activity corresponding to that node is halted 330. In one implementation, the transaction is reset to the last recorded state, rather than completely reset. If a transaction has initiated multiple transaction groups, the tasks assigned to a subset of the transaction group can be rolled back. For example, if one transaction group includes vprocs that are mapped to the failed node under the configuration table entry that was current when the transaction group was initiated, the tasks for that transaction group will need to be reset. Such a transaction is also referred to herein as an "impacted transaction group." If another transaction group, however, does not include vprocs that are mapped to the failed node under the configuration table entry that was current when the transaction group was initiated, that transaction group can continue to perform tasks once the system comes back online.

The tasks being performed by impacted transaction groups are halted and the system generates another configuration using the identified, unaffected vprocs 320. The new configuration will not include vprocs mapped to the failed node until that node has been restored. Tasks that have been reset can then be assigned to transaction groups initiated in accordance with the new configuration, if those tasks do not need data that is only accessible to the vprocs that were associated with the failed node. New configurations are also generated when a node is restored or added to the parallel system 327. Those configurations are created vproc-by-vproc 310. In this way, tasks are assigned to transaction groups that have access to the processing and storage resources of all the available nodes.

In one implementation, generating a new configuration includes reassigning storage resources to nodes. For example, storage resources that were assigned to a node that experienced a processor-related failure can be assigned to another node within the same clique (as discussed with reference to FIG. 2). In one implementation, the entries in the configuration table would then be updated to include information necessary to indicate such changes in node configuration.

In one implementation, in response to availability events (for example the failure, restoration, or addition of a node), new configurations can be generated to allow the processing of new transactions or reset transactions, while non-impacted transactions continue their processing because the previous configuration was preserved. In one implementation, the detrimental effect of failures is confined to its impact on specific virtual processors and associated transaction groups.

Figure 4:
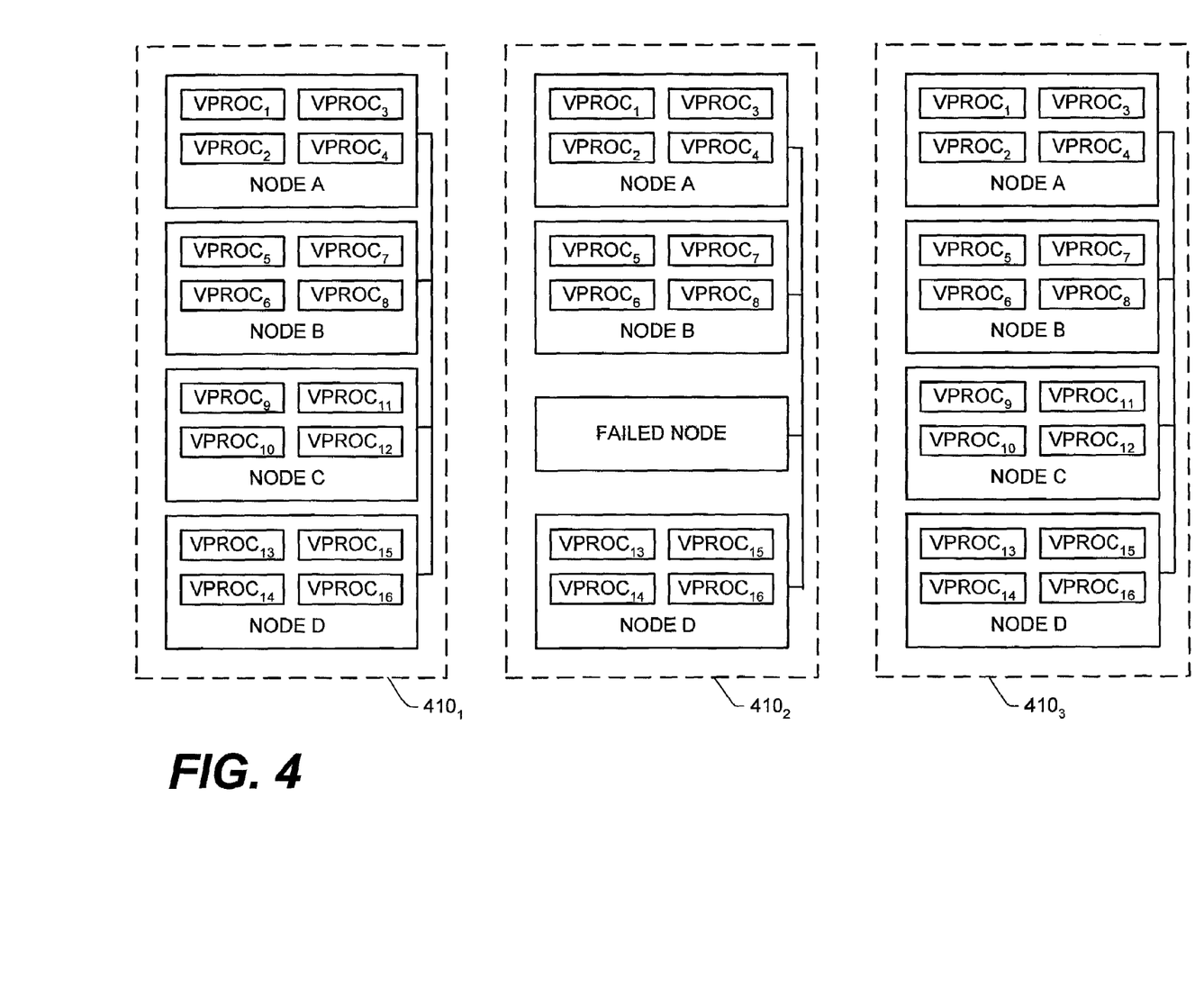
FIG. 4 is a block diagram of example node configurations.

FIG. 4 is a block diagram of example node configurations. The three configurations $410_{1-3}$ represent the mapping of virtual processors to nodes in three different entries of the configuration table. For example, if the parallel system is initiated with nodes A–D, the vprocs can be mapped as shown in configuration $410_1$. If node C then fails, a configuration is generated for the remaining vprocs associated with still-valid nodes. In one implementation, vprocs$_{1-4}$ are defined identically in the first two configurations $410_{1-2}$.

A third configuration $410_3$ is defined after node C has been restored. In one implementation, even if the third configuration $410_3$ is substantially identical to the first configuration $410_1$, each of the configurations $410_{1-3}$ will be retained in the configuration table until all transaction groups that correspond to a configuration have become inactive. It is possible, therefore, that the second configuration $410_2$ will be removed from the configuration table prior to the first configuration $410_1$, if all the tasks being performed by transaction groups assigned to the second configuration $410_2$ are completed prior to all the tasks being performed by transaction groups assigned to the first configuration $410_1$.

Figure 5:
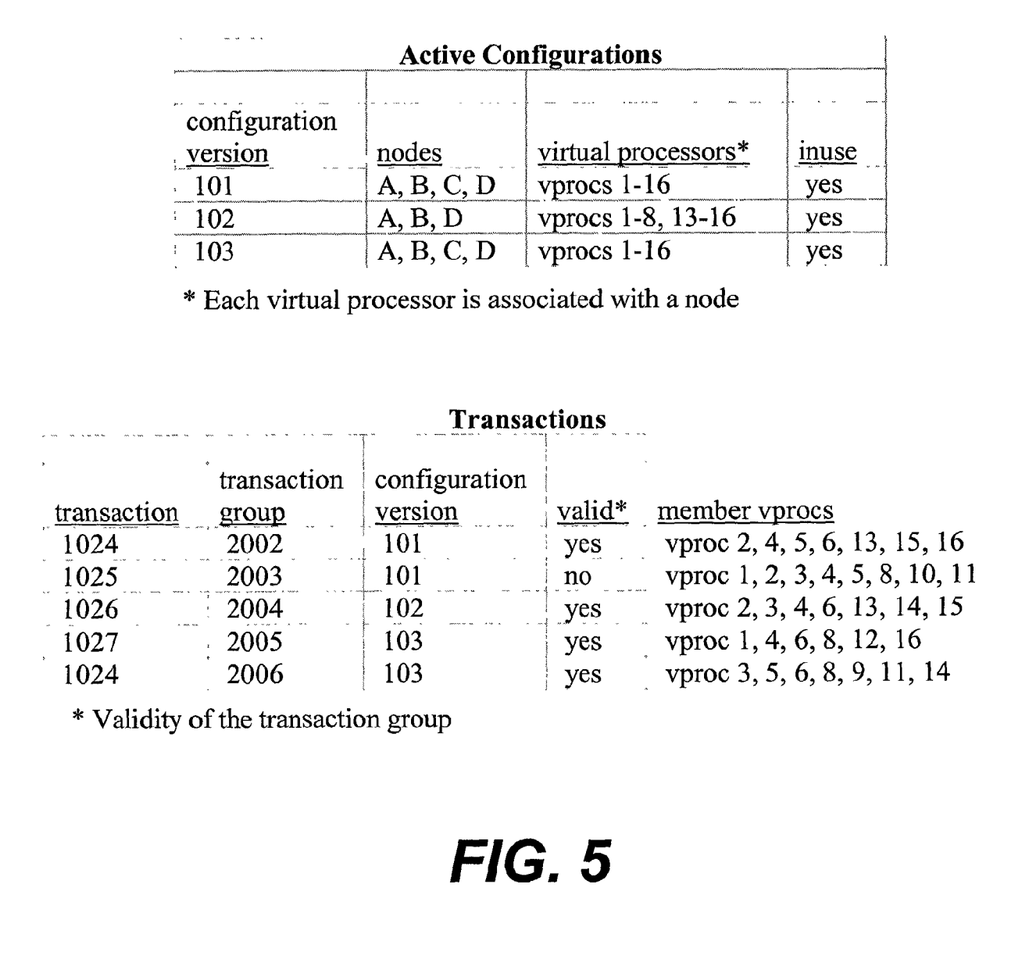
FIG. 5 depicts example active configurations and transactions tables.

FIG. 5 depicts example Active Configurations and Transactions tables. The Active Configurations table includes three configurations labeled with version nunbers corresponding to the order of generation. Version 101 was generated first. Initial requests for transaction groups are assigned that first version of the configuration. Version 102 is generated after the failure of node C. Transaction groups formed after that node failure are assigned to version 102. Those transaction groups will therefore not include vprocs 9–12. In one implementation, virtual processors are included as members in a transaction group based on the amount and range of data involved in a given transaction. In that case, when the node failure separating versions 101 and 102 occurs, each transaction group will be examined for viability based on whether member vprocs were associated with a failed node. In one implementation, any transaction associated with a group whose membership is impacted by this loss of virtual processors will necessarily be stopped and rolled back or reset to the nearest recorded point. Transactions that have no impacted transaction groups will continue to execute. The inuse column tracks whether active transaction groups are currently associated with the configuration table entry. When the last transaction group associated with a configuration table entry becomes inactive, the inuse column is set to no. The next administrative update of the tables will remove the transaction table entries that are not in use. In another implementation, entries are removed as soon as their are no associated, active transaction groups. In another implementation, use of entries is not tracked.

The Transaction table shows four active transactions, three of which are each associated with a single transaction group and one of which is associated with two transaction groups. Each transaction group refers to an independent association of virtual processors. The first two transactions 1024, 1025 are bound to groups 2002, 2003 that were formed during and therefore assigned to configuration version 101. When node C failed, assuming that vprocs 9–12 were assigned to that node in version 101, transaction group 2003 was impacted, due to vprocs 10 and 12. Transaction group 2002 does not include any of vprocs 9–12 and is therefore still valid. The third transaction 1026, bound to group 2004, is still valid, and does not include vprocs 9–12 because it was formed during the configuration that lacked node C. Baring subsequent failures, transaction group 2004 will run to completion. The final transaction 1027 is running tasks pursuant to a transaction group 2005 that is assigned to version 103, which reflects the recovery of node C. Transaction 1024 initiated a new transaction group 2006 assigned to version 103. In one implementation, version 102 does not include access to all storage resources. In that case transaction group 2004, does not require the unavailable resources. Transaction groups 2005 and 2006 could have been requested during configuration 102, but were deferred until version 103, because required storage resources were not available.

The text above described one or more specific embodiments of a broader invention. The invention also is carried out in a variety of alternative embodiments and thus is not limited to those described here. For example, while the invention has been described here in terms of a DBMS that uses a massively parallel processing (MPP) architecture, other types of database systems, including those that use a symmetric multiprocessing (SMP) architecture, are also useful in carrying out the invention. Many other embodiments are also within the scope of the following claims.

What is claimed is:

1. A method for executing database transactions, comprising the steps of:
    defining each node of a plurality of interconnected nodes in terms of processor and storage resources of a parallel computing system;
    mapping a first set of virtual processors across a first subset of the nodes to create a first map with at least one virtual processor being mapped to each node in the first subset;
    mapping a second set of virtual processors across a second subset of the nodes to create a second map with at least one virtual processor being mapped to each node in the second subset;
    storing the first map as a first configuration and the second map as a second configuration; and
    executing at least one transaction using the first set of virtual processors and simultaneously executing at least one transaction using the second set of virtual processors;
    wherein executing a transaction comprises:
        identifying tasks necessary to complete the transaction;
        identifying storage resources necessary to complete each of the tasks;
        defining one or more groups of virtual processors having access to the identified storage resources as one or more transaction groups;
        assigning to each task one of the transaction groups that includes virtual processors having access to resources necessary to complete the task; and
        completing each task using the virtual processors of the assigned transaction group.

2. The method of claim 1, wherein the first subset of the nodes includes all of the plurality of nodes and the second subset of nodes includes all of the plurality of nodes except for at least one failed node.

3. The method of claim 2, further comprising the steps of:
    mapping a third set of virtual processors across a third subset of the nodes to create a third map with at least one virtual processor being mapped to the third subset;
    storing the third map as a third configuration; and wherein the third subset of the nodes includes all of the plurality of nodes.

4. The method of claim 3, wherein the third subset includes at least one restored node.

5. The method of claim 2, wherein at least one transaction using the first set of virtual processors does not use any virtual processors mapped to the at least one failed node.

6. The method of claim 2, further comprising the step of:
halting an impacted transaction, the impacted transaction using the first set of virtual processors including at least one virtual processor mapped to one of the at least one failed nodes.

7. The method of claim 1, wherein the first and second configurations are stored as a configuration table and configurations are removed from the table when they are no longer associated with an executing transaction.

8. The method of claim 1, wherein using the first set of virtual processors consists of completing tasks assigned to transaction groups that include virtual processors from the first set of virtual processors.

9. The method of claim 1, wherein executing at least one transaction using the first set of virtual processors simultaneously with executing at least one transaction using the second set of virtual processors comprises executing a first transaction having at least first and second tasks, the first task executed by one or more virtual processors of the first set and the second task executed by one or more virtual processors of the second set.

10. A computer program, stored on a tangible storage medium, for use in executing database transactions, the program comprising executable instructions that cause a computer to
define each node of a plurality of interconnected nodes in terms of processor and storage resources of a parallel computing system;
map a first set of virtual processors across a first subset of the nodes to create a first map with at least one virtual processor being mapped to each node in the first subset;
map a second set of virtual processors across a second subset of the nodes to create a second map with at least one virtual processor being mapped to each node in the second subset;
store the first map as a first configuration and the second map as a second configuration; and
execute at least one transaction using the first set of virtual processors and simultaneously execute at least one transaction using the second set of virtual processors;
wherein executing a transaction comprises:
identifying tasks necessary to complete the transaction:
identifying storage resources necessary to complete each of the tasks;
defining one or more groups of virtual processors having access to the identified storage resources as one or more transaction groups;
assigning to each task one of the transaction groups that includes virtual processors having access to resources necessary to complete the task; and
completing each task using the virtual processors of the assigned transaction group.

11. The computer program of claim 10, wherein the first subset of the nodes includes all of the plurality of nodes and the second subset of nodes includes all of the plurality of nodes except for at least one failed node.

12. The computer program of claim 11, further comprising executable instructions that cause a computer to:
map a third set of virtual processors across a third subset of the nodes to create a third map with at least one virtual processor being mapped to each node in the third subset;
store the third map as a third configuration; and wherein the third subset of the nodes includes all of the plurality of nodes.

13. The computer program of claim 12, wherein the third subset includes at least one restored node.

14. The computer program of claim 11, wherein the at least one transaction using the first set of virtual processors does not use any virtual processors mapped to the at least one failed node.

15. The computer program of claim 11, further comprising executable instructions that cause a computer to:
halt an impacted transaction, the impacted transaction using the first set of virtual processors including at least one virtual processor mapped to one of the at least one failed nodes.

16. The computer program of claim 10, wherein the first and second configurations are stored as a configuration table and configurations are removed from the table when they are no longer associated with an executing transaction.

17. The computer program of claim 10, wherein using the first set of virtual processors consists of completing tasks assigned to transaction groups that include virtual processors from the first set of virtual processors.

18. The computer program of claim 10, wherein executing at least one transaction using the first set of virtual processors simultaneously with executing at least one transaction using the second set of virtual processors comprises executing a first transaction having at least first and second tasks, the first task executed by one or more virtual processors of the first set and the second task executed by one or more virtual processors of the second set.

19. A massively parallel processing system in which database transactions are executed using virtual processors, the processing system comprising:
one or more nodes;
a plurality of CPUs, each of the one or more nodes providing access to one or more CPUs;
a plurality of virtual processors each of the one or more CPUs providing access to one or more virtual processors;
each process configured to manage data stored in one of a plurality of data-storage facilities;
a database-management component configured to execute the transactions by
interconnecting the plurality of nodes;
mapping a first set of the virtual processors across a first subset of the nodes to create a first map with at least one virtual processor being mapped to each node in the first subset;
mapping a second set of the virtual processors across a second subset of the nodes to create a second map with at least one virtual processor being mapped to each node in the second subset;
storing the first map as a first configuration and the second map as a second configuration; and
executing at least one transaction using the first set of virtual processors and simultaneously executing at least one transaction using the second set of virtual processors;
wherein executing a transaction comprises:
identifying tasks necessary to complete the transaction;
identifying storage resources necessary to complete each of the tasks;
defining one or more groups of virtual processors having access to the identified storage resources as one or more transaction groups;

assigning to each task one of the transaction groups that includes virtual processors having access to resources necessary to complete the task; and completing each task using the virtual processors of the assigned transaction group.

20. The processing system of claim 19, wherein the first subset of the nodes includes all of the one or more nodes and the second subset of nodes includes all of the one or more nodes except for at least one failed node.

21. The processing system of claim 20, wherein the database-management component is also configured to execute the transactions by:

mapping a third set of virtual processors across a third subset of the nodes to create a third map with at least one virtual processor being mapped to each node in the third subset;

storing the third map as a third configuration; and wherein the third subset of the nodes includes all of the one or more nodes.

22. The processing system of claim 21, wherein the third subset includes at least one restored node.

23. The processing system of claim 20, wherein the at least one transaction using the first set of virtual processors does not use any virtual processors mapped to the at least one failed node.

24. The processing system of claim 20, wherein the database-management component is also configured to execute the transactions by:

halting an impacted transaction, the impacted transaction using the first set of virtual processors including at least one virtual processor mapped to one of the at least one failed nodes.

25. The processing system of claim 19, wherein the first and second configurations are stored as a configuration table and configurations are removed from the table when they are no longer associated with an executing transaction.

26. The processing system of claim 19, wherein using the first set of virtual processors consists of completing tasks assigned to transaction groups that include virtual processors from the first set of virtual processors.

27. The processing system of claim 19, wherein executing at least one transaction using the first set of virtual processors simultaneously with executing at least one transaction using the second set of virtual processors comprises executing a first transaction having at least first and second tasks, the first task executed by one or more virtual processors of the first set and the second task executed by one or more virtual processors of the second set.

* * * * *